(12) United States Patent
Nguyen

(10) Patent No.: US 6,560,083 B2
(45) Date of Patent: May 6, 2003

(54) DYNAMIC CRITICAL BATTERY DETECTION MECHANISM

(75) Inventor: Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 09/750,838

(22) Filed: Dec. 27, 2000

(65) Prior Publication Data

US 2002/0080543 A1 Jun. 27, 2002

(51) Int. Cl.[7] .............................. H02H 3/18; H02H 3/26; H02H 3/42
(52) U.S. Cl. ............................................. 361/86; 361/18
(58) Field of Search ..................... 361/86, 18; 713/340; 327/310, 317

(56) References Cited

U.S. PATENT DOCUMENTS

| | | | | |
|---|---|---|---|---|
| 4,342,922 A | * | 8/1982 | DiMassimo et al. | 307/66 |
| 4,816,768 A | * | 3/1989 | Champlin | 324/428 |
| 5,223,748 A | * | 6/1993 | Mumper et al. | 307/64 |
| 5,457,414 A | * | 10/1995 | Inglis | 327/77 |
| 5,739,596 A | * | 4/1998 | Takizawa et al. | 307/66 |
| 5,963,015 A | * | 10/1999 | Lee | 320/128 |
| 6,310,481 B2 | * | 10/2001 | Bertness | 324/430 |

* cited by examiner

Primary Examiner—Brian Sircus
Assistant Examiner—Zeev Kitov
(74) Attorney, Agent, or Firm—Blakely, Sokoloff, Taylor & Zafman LLP

(57) ABSTRACT

An electronic device including a voltage supply source is presented. Included in the electronic device is a low voltage detection circuit that is connected to the voltage supply source. Also, a voltage offset circuit is connected to the low voltage detection circuit. The voltage offset circuit offsets a voltage drop in the low voltage detection circuit that is caused by a voltage transient. Therefore, a false reading is prevented in the low voltage detection circuit.

40 Claims, 5 Drawing Sheets

DYNAMIC CRITICAL BATTERY DETECTION MECHANISM

BACKGROUND OF THE INVENTION

1. Field of the Invention

This invention relates to battery protection circuitry, and more particularly to a method and apparatus of preventing early shutdown of computer systems due to a power demand change.

2. Background Information

Computer systems that are capable to be powered by battery or a direct current (DC) source that is supplied through an alternating current (AC) adapter typically have mechanisms to protect batteries from damage and to allow the system to switch between the two types of power sources. The main purpose of these battery protection circuits are to detect: whether the battery has enough energy to run the system, i.e. the battery is good, the battery is low, or the battery is critically low. This information is used by the system power management controller to determine if a power failure is about to occur, or to shutdown the whole system itself. This is done to prevent deep charging of the battery which can cause irreversible damage to the battery.

Many computer systems that are powered by either battery or DC sources through an AC adapter, such as notebook computer systems, have different processing speeds depending on the power source. Some of these notebook computer systems will run at a higher processing frequency when powered by an DC supply through an AC adapter as opposed to battery power. When the power source switches between the DC source and battery, a transient may occur. This transient can lead to a false reading by the power management system, thus causing the computer system to prematurely shutdown. As the batteries in computer systems become smaller, i.e. less battery cells, (which reduces the weight and can also reduce the size of the system) the transient becomes greater and the reliability of the power management system becomes a greater issue.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The invention generally relates to a method and apparatus for offsetting computer system transients that occur due to switching of supply sources. Referring to the figures, exemplary embodiments of the invention will now be described. The exemplary embodiments are provided to illustrate the invention and should not be construed as limiting the scope of the invention.

Figure 1:
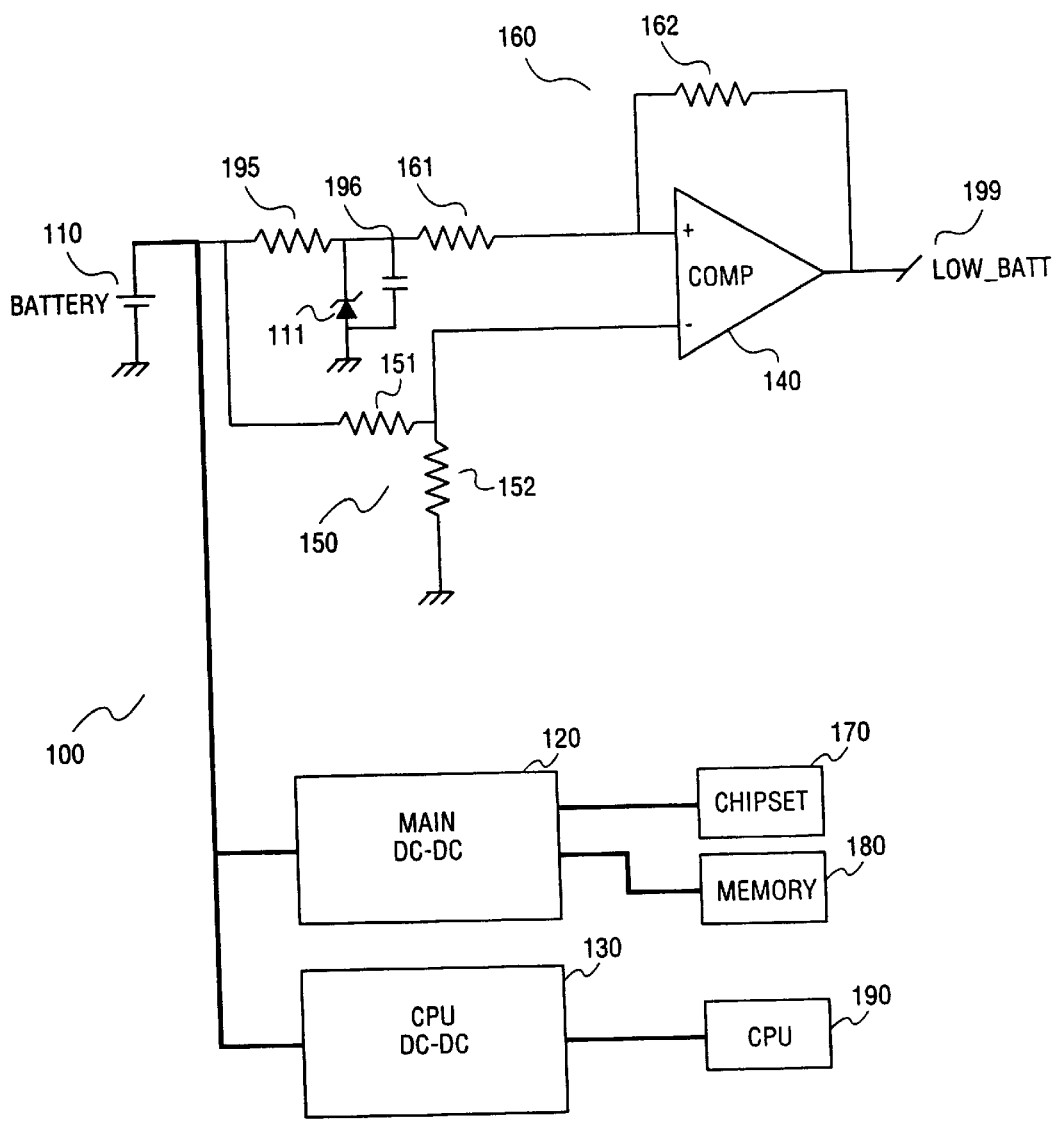
FIG. 1 illustrates a battery detection circuit.

FIG. 1 illustrates a typical computer system 100 that is powered by battery 110 or a direct current (DC) supply through an alternating current (AC) adapter (not shown). Computer system 100 may be a notebook style computer system or any portable processing device. Computer system 100 also contains main voltage regulator 120 for regulating voltage supply to chipset 170 and memory 180. Also, central processing unit (CPU) 190 voltage comparator 140, voltage divider 150, and hysteresis feedback 160 are included. CPU 190 may be a dual processing speed CPU. That is, CPU 190 may run at one processing frequency when computer system 100 is powered by battery, and another processing frequency when powered by a DC supply through an AC adapter.

Computer system 100 has an accurate reference voltage 111, such as 1.225 V or a 2.45V band gap type reference with a ±1% tolerance. Power to voltage reference 111 is provided by series resistor 195 and is decoupled by capacitor 196 to filter out unwanted noise. Voltage divider network 150 is comprised of resistor 151 and resistor 152. Resistors 151 and 152 are used to divide the critical supplied voltage down to the same level as reference voltage 111. Voltage comparator 140 is used to compare reference voltage 111 to that of the voltage at voltage divider 150. The output voltage of comparator 140, indicated by LOW_BATT signal 199, is low (where "low" is a determined voltage level equated to a low state) which indicates that the battery voltage level is normal for operating levels. When the battery voltage level becomes low or critically low, the voltage level at voltage divider 150 will be lower than voltage reference 111. Therefore, LOW_BATT signal 199 will be high (where "high" is a determined voltage level equated to a high state), which indicates that battery 110 is running low. Hysterisis feedback 160 is comprised of resistors 161 and 162. Hysteresis feedback 160 is used to provide a crisp transition of LOW_BATT signal 199 and to prevent unwanted oscillation from occurring.

When system 100 switches from DC supplied voltage to battery 110, CPU 190 will switch to a lower frequency, such as from 600 MHz. to 500 MHz. This drop in processing frequency causes a transient due to a change in current demand. Also, when system 100 switches from battery 110 to DC supplied voltage, CPU 190 will switch to a higher frequency, such as from 500 MHz. to 600 MHz. This increase in processing frequency causes a transient due to a change in current demand.

Assuming battery 110 is a multi-celled battery, such as a three cell lithium-ion battery with the three battery cells in series, upon computer system 100 switching between DC supplied voltage to battery 110, a voltage drop occurs. Since voltage comparator 140 does not compensate for the voltage drop due to a transient caused by the switching, a false tripping of LOW_BATT signal 199 will occur. When battery 110 is a six-cell battery (two three-cell batteries in parallel), the impedance is about half as large as the impedance of a three-celled battery and the transient is not as large. Therefore, a false tripping of LOW_BATT signal 199 may not occur. The design of computer system 100 also does not compensate for a voltage drop internal to battery 110 caused by events such as internal battery resistance, battery switch-on resistance and current-sense resistance.

Figure 2:
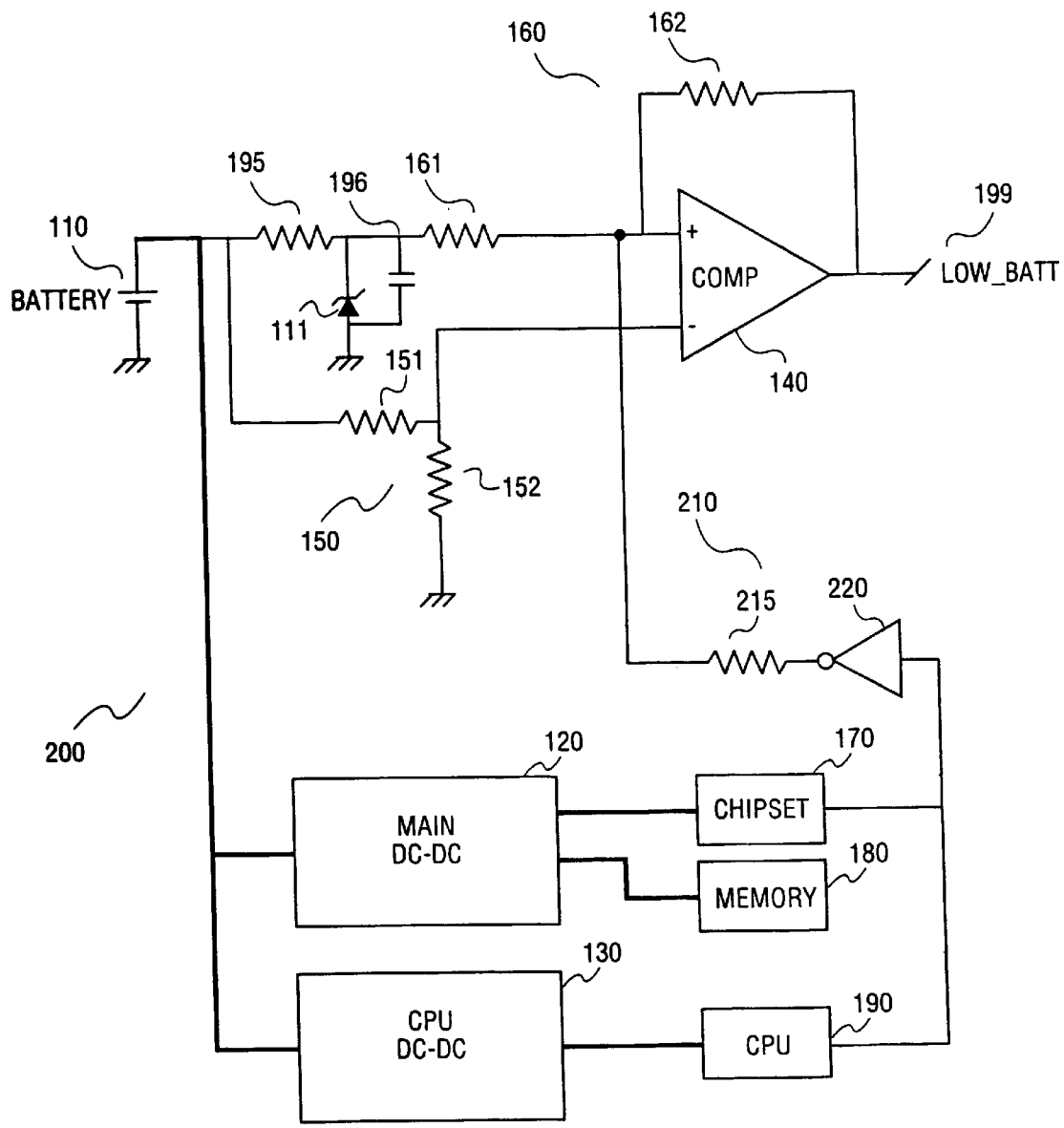
FIG. 2 illustrates an embodiment of the invention having a voltage offset circuit.

FIG. 2 illustrates an embodiment of the invention having computer system 200 with compensation circuit 210. Compensation circuit 210 includes offset resistor 215 and inverter 220. Compensation circuit 210 uses signals present in computer system 200 produced by CPU 190. These signals may include stop clock signals, deep sleep signals, processor frequency hi/lo, and voltage level hi/lo. The signals change state when the power source changes from DC supplied voltage to battery, or vice versa. A single signal, or combination of signals can be used with compensation circuit 210 to offset the voltage drop caused by changed current demand. The offset changes the voltage at comparator 140 so a comparison of voltages will not result in a false trigger of LOW_BATT signal 199. Therefore, a false reading is prevented and the system is prevented from shutting down prematurely. Also, battery life is increased by preventing the premature shutdown, where computer system 100 would need to be restarted.

Figure 3:
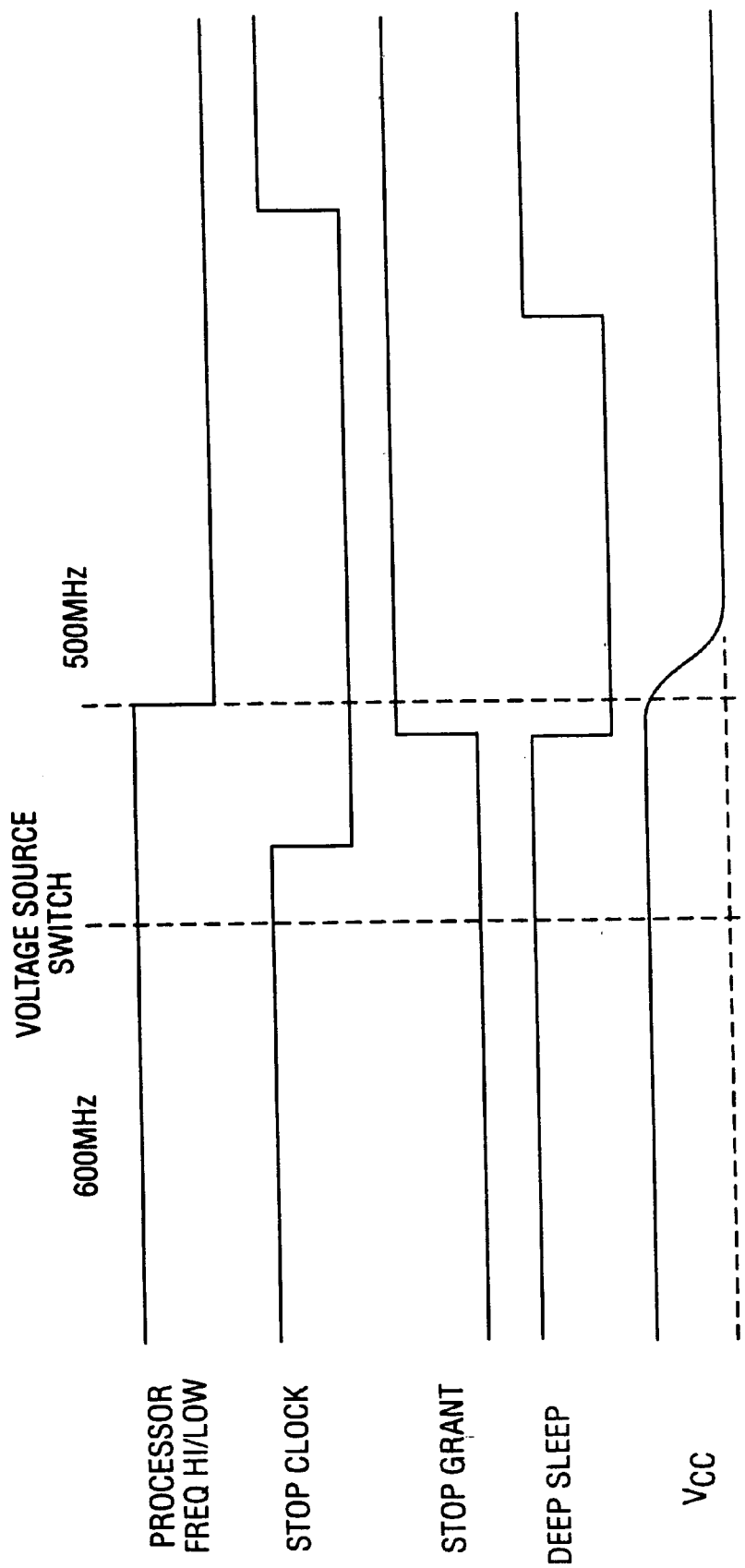
FIG. 3 illustrates an example of a timing of processing signals for computer system mode detection.

FIG. 3 illustrates examples of signals produced by CPU 190 and timing of the signals upon switching of supplied voltage sources. It can be seen that a slight delay occurs before the signals respond to the change of voltage source. The signals illustrated in FIG. 3 represent possible timing due to switching from a DC supplied voltage to battery 110.

In another embodiment, reference voltage 111 can be modified upon a change DC supplied voltage to battery, or vice versa. This can be accomplished by using the signals produced by CPU 190 and by modifying variable circuit elements. Digital to analog (D/A) or analog to digital (A/D) devices can be used along with variable elements. An D/A device converts a digital signal to an analog voltage. For example, a stop clock signal can be converted by a D/A device to a voltage for offsetting the voltage drop caused by a voltage source switching transient. An A/D device converts an analog voltage to a digital signal. For example, a voltage can be converted by an A/D device to a signal that can be used by other components to offset the voltage drop caused by a voltage source switching transient. Also, the modification can be accomplished by using potentiometers that replace resistors.

Figure 4:
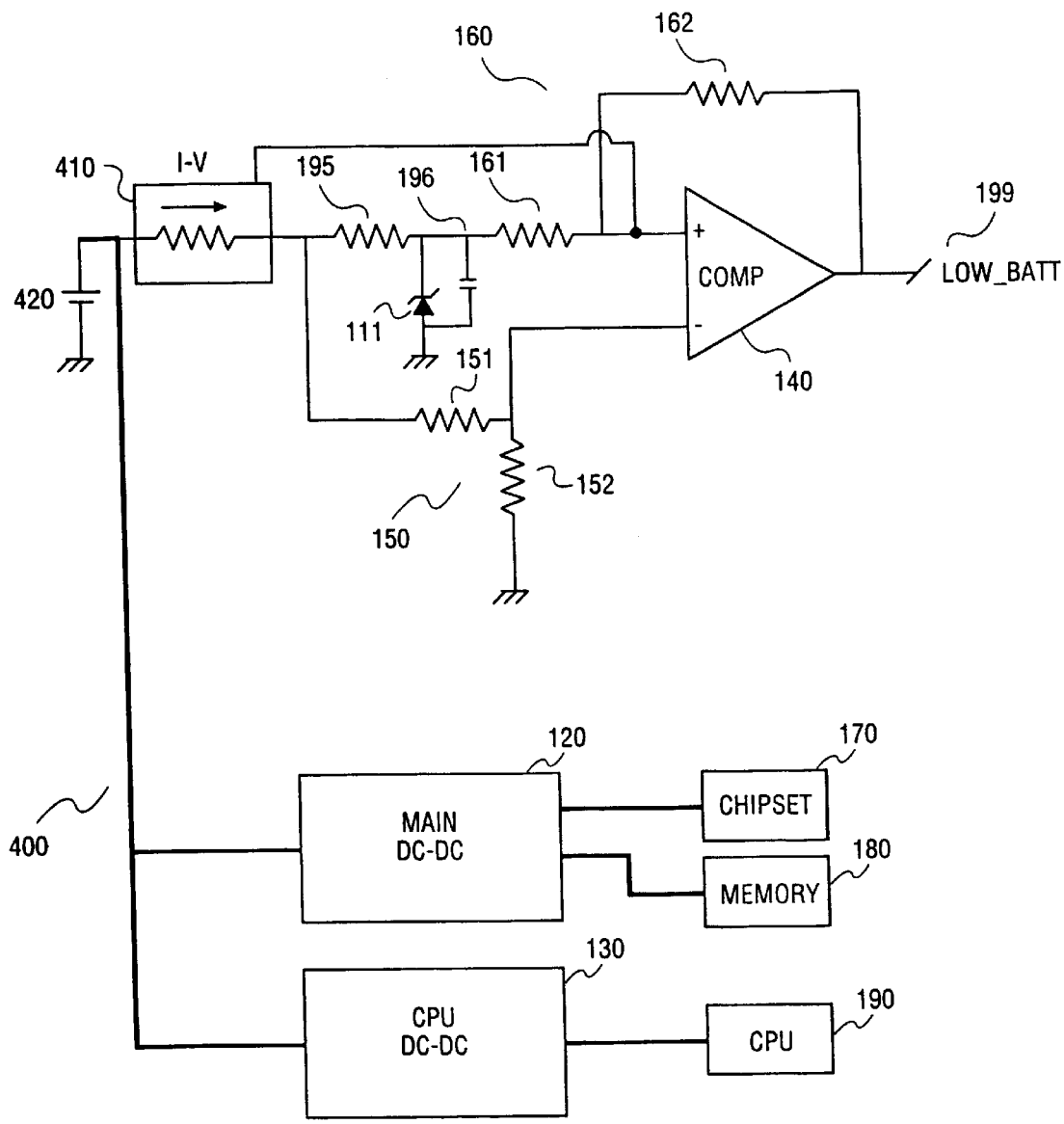
FIG. 4 illustrates an embodiment of the invention having a current monitor circuit.

FIG. 4 illustrates another embodiment of the invention that accomplishes compensation for voltage drops caused by transients. This embodiment does not depend on processing signals from CPU 190. Current monitor circuit 410 is used to monitor the current from voltage supply source 420. Voltage supply source 420 can be DC supplied voltage or battery 110. If the current from voltage supply source 420 is high (based on a predetermined reference current), then the reference voltage is adjusted down to compensate for the voltage drop. The higher the current from voltage supply source 420, the larger the voltage drop caused by a transient. The adjustment may be accomplished as is presented in previous embodiments, without relying on CPU signals.

Figure 5:
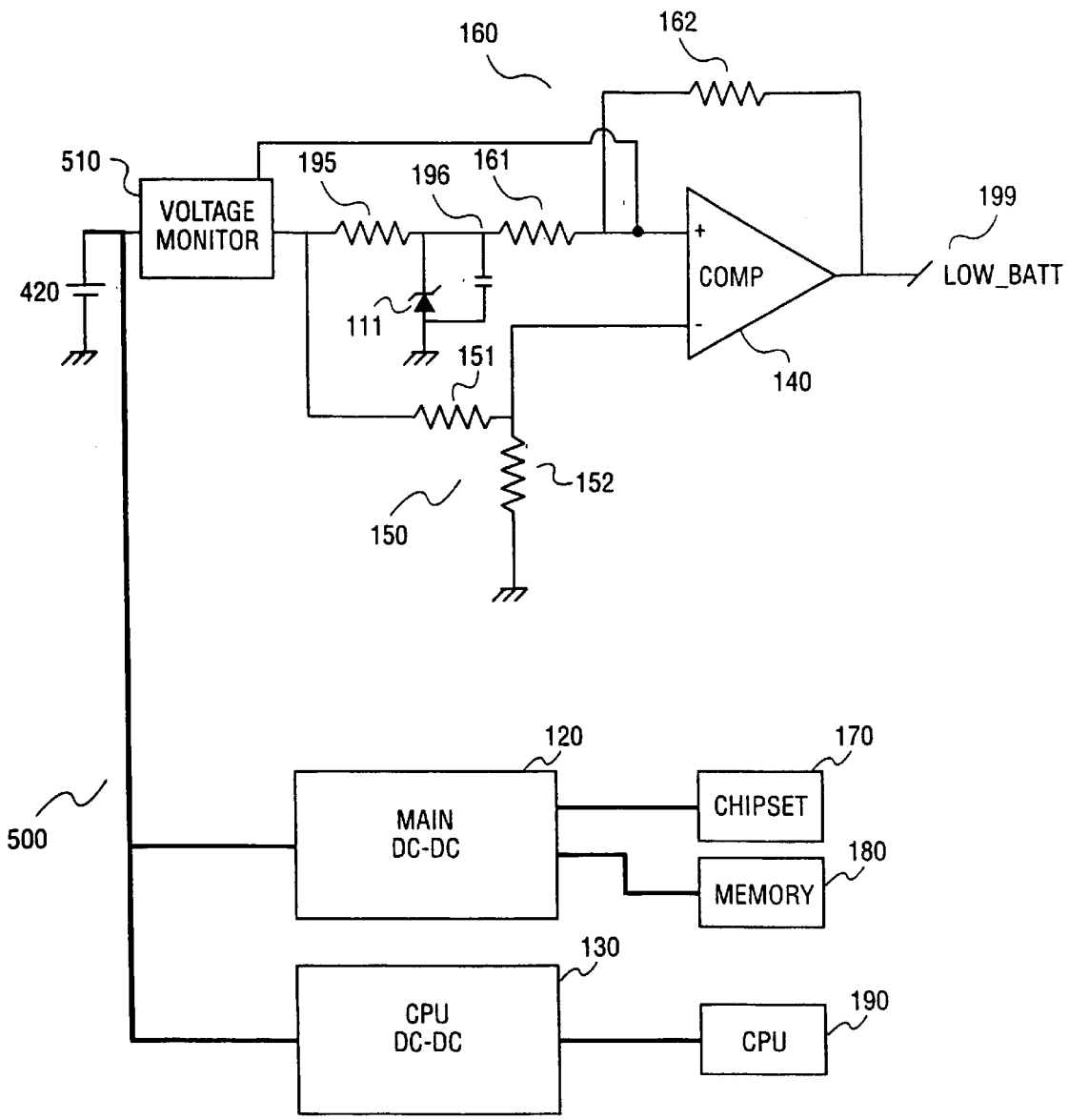
FIG. 5 illustrates an embodiment of the invention having a voltage monitor circuit.

FIG. 5 illustrates another embodiment of the invention that accomplishes compensation for voltage drops caused by transients. This embodiment does not depend on processing signals from CPU 190. Voltage monitor circuit 510 is used to monitor the voltage at voltage supply source 420. Voltage supply source 420 can be DC supplied voltage or battery 110. If the voltage from voltage supply source 420 changes abruptly (from a predetermined reference voltage), then the reference voltage is adjusted up to compensate for the transient voltage drop. The adjustment may be accomplished as is presented in previous embodiments, without relying on CPU signals.

The above embodiments can also be stored on a device or medium and read by a machine to perform instructions. The device or medium may include a solid state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:

a voltage supply source;

a low voltage detection circuit coupled to the voltage supply source; and a voltage offset circuit coupled to the low voltage detection circuit, wherein the voltage offset circuit offsets a voltage drop in the low voltage detection circuit caused by a voltage transient to prevent a false reading in the low voltage detection circuit and the voltage offset circuit uses at least one signal from a central processing unit to detect a voltage drop due to a change of the voltage supply source.

2. The apparatus of claim 1, wherein the voltage supply source is one of a battery and a direct current (DC) supply.

3. The apparatus of claim 1, wherein the voltage transient is caused by a change of the voltage supply source.

4. The apparatus of claim 1, wherein the voltage offset circuit comprises a current monitor circuit, wherein a current from the voltage supply source is monitored for transients, and an offset voltage is generated.

5. The apparatus of claim 1, wherein the voltage offset circuit comprises a voltage monitor circuit to monitor a voltage from the voltage supply source for transients, and an offset voltage is generated.

6. The apparatus of claim 1, wherein the voltage offset circuit comprises an inverter and at least one resistor, wherein the inverter and the at least one resistor generate a positive offset voltage.

7. A system comprising:

a processor coupled to a processor voltage regulator;

a bus coupled to the processor;

a memory coupled to a main voltage regulator;

a voltage supply source coupled to the main voltage regulator and the processor voltage regulator;

a low voltage detection circuit coupled to the voltage supply source; and a voltage offset circuit coupled to the low voltage detection circuit, wherein the voltage offset circuit offsets a voltage drop in the low voltage detection circuit caused by a voltage transient to prevent a false reading in the low voltage detection circuit and the voltage offset circuit uses at least one signal from the processor to detect a voltage drop due to a change of the voltage supply source.

8. The system of claim 7, wherein the voltage supply source is one of a battery and a direct current (DC) supply.

9. The system of claim 7, wherein the voltage transient is caused by a change of the voltage supply source.

10. The system of claim 7, wherein the voltage offset circuit comprises a current monitor circuit, wherein a current from the voltage supply source is monitored for transients, and an offset voltage is generated.

11. The system of claim 7, wherein the voltage offset circuit comprises a voltage monitor circuit to monitor a voltage from the voltage supply source for transients, and an offset voltage is generated.

12. The system of claim 7, wherein the voltage offset circuit comprises an inverter and at least one resistor, wherein the inverter and the at least one resistor generate a positive offset voltage.

13. A method comprising:
   determining if a first voltage is lower than a reference voltage;
   determining if a voltage supply source has changed using at least one signal from a central processing unit; and
   generating a second voltage to offset a voltage drop if the voltage supply source has changed and the first voltage is lower than the reference voltage,
   wherein the second voltage prevents a false trigger caused by a change of the voltage supply source.

14. The method of claim 13, wherein the voltage supply source is one of a battery and a direct current (DC) supply.

15. The method of claim 13, wherein generating the second voltage further comprises monitoring current from the voltage supply source for transients.

16. The method of claim 13, wherein generating the second voltage further comprises monitoring voltage at the voltage supply source for transients.

17. The method of claim 13, wherein generating a second voltage prevents the voltage supply source from draining prematurely.

18. A program storage device readable by a machine comprising instructions that cause the machine to:
   determine if a first voltage is lower than a reference voltage;
   determine if a voltage supply source has changed; and
   generate a second voltage to offset a voltage drop if the voltage supply source has changed and the first voltage is lower than the reference voltage,
   wherein the second voltage prevents a false trigger caused by a change of the voltage supply source.

19. The program storage device of claim 18, wherein the voltage supply source is one of a battery and a direct current (DC) supply.

20. The program storage device of claim 18, wherein the instruction that causes the machine to determine if a voltage supply source has changed comprises using at least one signal from a central processing unit.

21. The program storage device of claim 18, wherein the instruction that causes the machine to generate the second voltage further comprises an instruction that causes the machine to monitor current from the voltage supply source for transients.

22. The program storage device of claim 18, wherein the instruction that causes the machine to generate the second voltage further comprises an instruction that causes the machine to monitor voltage at the voltage supply source for transients.

23. The program storage device of claim 18, wherein the instruction that causes the machine to generate a second voltage prevents the voltage supply source from draining prematurely.

24. An apparatus comprising:
   a voltage supply source;
   a low voltage detection circuit coupled to the voltage supply source; and
   a voltage offset circuit coupled to the low voltage detection circuit,
   wherein the voltage offset circuit offsets a voltage drop in the low voltage detection circuit caused by a voltage transient to prevent a false reading in the low voltage detection circuit and the voltage offset circuit comprises a current monitor circuit, wherein a current from the voltage supply source is monitored for transients, and an offset voltage is generated.

25. The apparatus of claim 24, wherein the voltage supply source is one of a battery and a direct current (DC) supply.

26. The apparatus of claim 24, wherein the voltage transient is caused by a change of the voltage supply source.

27. The apparatus of claim 24, wherein the voltage offset circuit comprises a voltage monitor circuit to monitor a voltage from the voltage supply source for transients, and an offset voltage is generated.

28. The apparatus of claim 24, wherein the voltage offset circuit comprises an inverter and at least one resistor, wherein the inverter and the at least one resistor generate a positive offset voltage.

29. The apparatus of claim 24, wherein the voltage offset circuit uses at least one signal from a central processing unit to detect a voltage drop due to a change of the voltage supply source.

30. A system comprising:
   a processor coupled to a processor voltage regulator;
   a bus coupled to the processor;
   a memory coupled to a main voltage regulator;
   a voltage supply source coupled to the main voltage regulator and the processor voltage regulator;
   a low voltage detection circuit coupled to the voltage supply source; and
   a voltage offset circuit coupled to the low voltage detection circuit,
   wherein the voltage offset circuit offsets a voltage drop in the low voltage detection circuit caused by a voltage transient to prevent a false reading in the low voltage detection circuit and the voltage offset circuit comprises a current monitor circuit, wherein a current from the voltage supply source is monitored for transients, and an offset voltage is generated.

31. The system of claim 30, wherein the voltage supply source is one of a battery and a direct current (DC) supply.

32. The system of claim 30, wherein the voltage transient is caused by a change of the voltage supply source.

33. The system of claim 30, wherein the voltage offset circuit uses at least one signal from the processor to detect a voltage drop due to a change of the voltage supply source.

34. The system of claim 30, wherein the voltage offset circuit comprises a voltage monitor circuit to monitor a voltage from the voltage supply source for transients, and an offset voltage is generated.

35. The system of claim 30, wherein the voltage offset circuit comprises an inverter and at least one resistor, wherein the inverter and the at least one resistor generate a positive offset voltage.

36. A method comprising:
   determining if a first voltage is lower than a reference voltage;
   determining if a voltage supply source has changed; and
   generating a second voltage to offset a voltage drop if the voltage supply source has changed and the first voltage is lower than the reference voltage by monitoring current from the voltage supply source for transients,
   wherein the second voltage prevents a false trigger caused by a change of the voltage supply source.

37. The method of claim 36, wherein the voltage supply source is one of a battery and a direct current (DC) supply.

38. The method of claim 36, wherein determining if a voltage supply source has changed comprises using at least one signal from a central processing unit.

39. The method of claim 36, wherein generating the second voltage further comprises monitoring voltage at the voltage supply source for transients.

40. The method of claim 36, wherein generating a second voltage prevents the voltage supply source from draining prematurely.

* * * * *